June 2, 1942.   G. C. FRENCH   2,285,025
PIPE OPENING AND FLARING TOOL
Filed Aug. 8, 1940

INVENTOR
Gordon C. French
Edw. S. Higgins
ATTORNEY

Patented June 2, 1942

2,285,025

UNITED STATES PATENT OFFICE 2,285,025

PIPE OPENING AND FLARING TOOL

Gordon C. French, Yonkers, N. Y.

Application August 8, 1940, Serial No. 351,794

1 Claim. (Cl. 153—79)

This invention relates generally to plumber's tools and more particularly to tools for opening an dflaring the ends of broken pipes such as water pipes.

When excavation is carried on in the streets, it often happens that water and other pipes in the street are broken or otherwise damaged often leaving the pipe with a broken open end, with the edges of the open end jaggered and split and often compressed together making it difficult to repair the pipe.

It is an object of my invention to provide a tool that will readily open the pressed together end of a broken pipe and will readily flare the edge of said end when opened.

Another object is to provide such a tool that is adapted to open and to flare pipes of different sizes.

Another object is to provide a tool that may be used even when water is flowing under pressure from the pipe to be repaired.

Another object is to provide such a tool that is simple and rugged in construction and inexpensive to manufacture.

Figure 1:
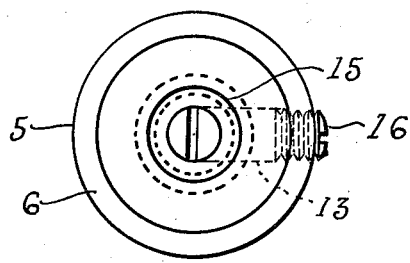
Fig. 1 is a top plan view of my improved flaring tool.
Figure 2:
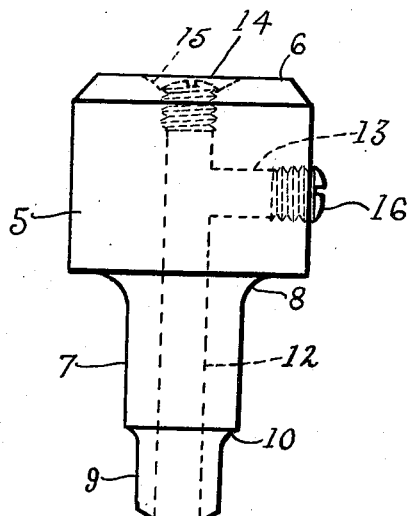
Fig. 2 is a side view thereof.

My improved tool is formed of steel or any other suitable metal and comprises a cylindrical body portion 5 with a head portion 6. Extending from the bottom of the body portion is a cylindrical shank portion 7 with a flaring shoulder portion 8 at its upper end, and extending from the bottom of the shank portion 8 is another cylindrical shank portion 9 formed with a flaring shoulder 10 at its upper end. The diameter of the shank 8 is less than the diameter of the shank 7 and terminates at its lower extremity in a pointed end 11.

An opening 12 extends from one end of the tool to the other and centrally through the body and shank portions. Another opening 13 communicates with the central opening 12 and extends through the body portion to the side thereof. The upper end of the opening 12 in the head portion 6 is screw threaded to receive a screw threaded plug 14 for plugging the opening 12 at this point. The head portion 6 is formed with a counter-sunk portion 15 to permit the plug to be sunk below the upper surface of the head. The outer end of the opening 13 is also screw threaded to receive a similar screw threaded plug 16 for plugging said opening 13.

The shank portions are of different size diameters for operating on different size pipes. The smaller shank portion 9 may for example be for operating on ½ inch pipes and the larger shank portion 7 on ¾ inch pipes. Of course the shank portions may be of different sizes and a single shank portion or more than two shank portions may be formed if desired.

In using the improved tool, the pointed end 11 is first inserted into the broken end of the pipe, the end 11 being small enough to permit the tool to take a "bite" even if the broken edge of the pipe were pressed together when broken. The outer surface of the head 6 is then struck with a hammer or other suitable tool for driving the tool further into the broken pipe for opening the broken end thereof.

For flaring the edge of the broken end of the pipe, the tool is driven home into the pipe until the shoulder portion 10 of shank 9 or the shoulder 8 of shank 7 engages said edge and flares it outwardly as will be understood.

If water is flowing from the end of the pipe being repaired, the openings or passages 12 and 13 permit the tool to be inserted into the pipe end and the water to pass through the tool thereby relieving the pressure against the tool. If it is desired to have the water pass out through the head end of the tool, the plug 14 is removed but if it is desired to have it escape through the side opening 13, the plug 16 is removed as will be understood. The counter-sunk portion 15 in the head 6 permits the striking of the head without touching the plug 14.

I claim:

A tool of the kind described comprising a metallic cylindrical body portion having a head, a shank portion extending from said body portion, a flaring shoulder portion at one end of said shank portion, another shank portion of less diameter than the first shank portion extending from the first shank portion and terminating in a knife edge portion, a flaring shoulder on said latter shank portion, an opening extending centrally through said body and shank portions, said body portion having a lateral opening communicating with the central opening, a removable plug in said lateral opening, said head portion being formed with a counter-sunk portion to receive a plug for the central opening.

GORDON C. FRENCH.